United States Patent [19]
Gaiser

[11] 3,818,706
[45] June 25, 1974

[54] MASTER CYLINDER WITH RESILIENTLY SEPARATED PRIMARY AND SECONDARY PISTONS

[75] Inventor: Robert F. Gaiser, St. Joseph, Mich.
[73] Assignee: The Bendix Corporation, South Bend, Ind.
[22] Filed: Dec. 3, 1971
[21] Appl. No.: 204,550

[52] U.S. Cl............... 60/562, 60/589, 188/345
[51] Int. Cl.............................................. F15b 7/08
[58] Field of Search........... 60/54, 54.6 E, 562, 581, 60/589; 188/345

[56] References Cited
UNITED STATES PATENTS

| | | | |
|---|---|---|---|
| 3,064,432 | 11/1962 | Shutt | 60/54.6 E |
| 3,633,367 | 1/1972 | Baldwin | 60/562 |
| 3,701,257 | 10/1972 | Gaiser | 60/54.6 R |

*Primary Examiner*—Edgar W. Geoghegan
*Assistant Examiner*—A. M. Zupcic
*Attorney, Agent, or Firm*—Leo H. McCormick, Jr.; William N. Antonis

[57] ABSTRACT

A master cylinder for use in a dual hydraulic system having first and second pistons individually activated by independent resilient means responsive to an input force supplied by an operator.

9 Claims, 4 Drawing Figures

INVENTOR.
ROBERT F. GAISER
BY
Leo H. McCormick Jr.
ATTORNEY

INVENTOR.
ROBERT F. GAISER
BY
Leo H. McCormick Jr.
ATTORNEY

MASTER CYLINDER WITH RESILIENTLY SEPARATED PRIMARY AND SECONDARY PISTONS

BACKGROUND OF THE INVENTION

Safety features in modern vehicles have included dual hydraulically operated braking systems for front and rear brakes responsive to a single actuation member. Dual hydraulic systems each require a pressurizing chamber and are normally of an in line orientation resulting in an approximately two fold length increase over prior master cylinders. The over length of the dual system master cylinder has presented a space problem under the hood of such vehicles since the majority of new vehicles are equipped with air conditioning, large breathing recirculation system for smog control, windwhield washers, alternators, etc. In my copending U. S. application Ser. No. 133,047 filed Apr. 12, 1971, now U.S. Pat. No. 3,701,257, assigned to the common assignee of this application and incorporated herein by reference, I disclosed how the overall length of a dual system master cylinder could be reduced about 50 percent by telescoping a secondary piston inside a primary piston. In this master cylinder the primary and secondary pistons are tied together. However, through later developments, I discovered that the primary and secondary pistons need not operate in unison as long as the communication between a supply reservoir and the chamber for the primary piston is closed first and opened last.

SUMMARY OF THE INVENTION

From the above I realized that the primary and secondary pistons need not be physically cammed to each other but would operate equally well if resilient means are provided to separate the pistons from each other and the housing of the master cylinder to establish pressurizing chambers whose volumetric size could be sequentially varied. An input force initially overcomes a first portion of the resilient means to permit the primary piston to move and close a first control valve to prevent fluid flow between the primary variable volume chamber and a supply reservoir. Further movement of the primary piston develops a first pressure force in the primary variable volume chamber. The first pressure force in conjunction with the reactive force which overcomes the first portion of the piston means are now combined to overcome a second portion of the resilient means to permit the secondary piston to move. During initial movement of the secondary piston a second control valve is closed to prevent communication from the secondary variable volume chamber to the supply reservoir. Further movement of the secondary piston creates a second pressure force in the secondary variable volume chamber. Upon termination of the input force the above sequence will be reversed with the second valve means opening first and the first valve means opening last. The above resilient means will bias the primary and secondary pistons and prevent development of a lock up pressure in the primary variable volume by eliminating any pressure build-up in the secondary chamber. Any pressure build-up will act against the housing and the primary piston to open the communication with the reservoir and release the built up pressure.

It is therefore the object of this invention to provide a master cylinder with independently controlled primary and secondary piston means responsive to a single input actuator.

It is another object of this invention to provide a master cylinder with compensating valve means responsive to movement of the primary and secondary pistons for preventing pressure build up between the primary and secondary pistons upon termination of an actuator force.

It is still a further object of this invention to provide a master cylinder with a plurality of compensating valves each individually responsive to a particular pressurizing piston.

These and other objects will be apparent from reading this specification and viewing the drawings.

DETAILED DESCRIPTION OF THE PREFERRED EMBODIMENT

Figure 1:
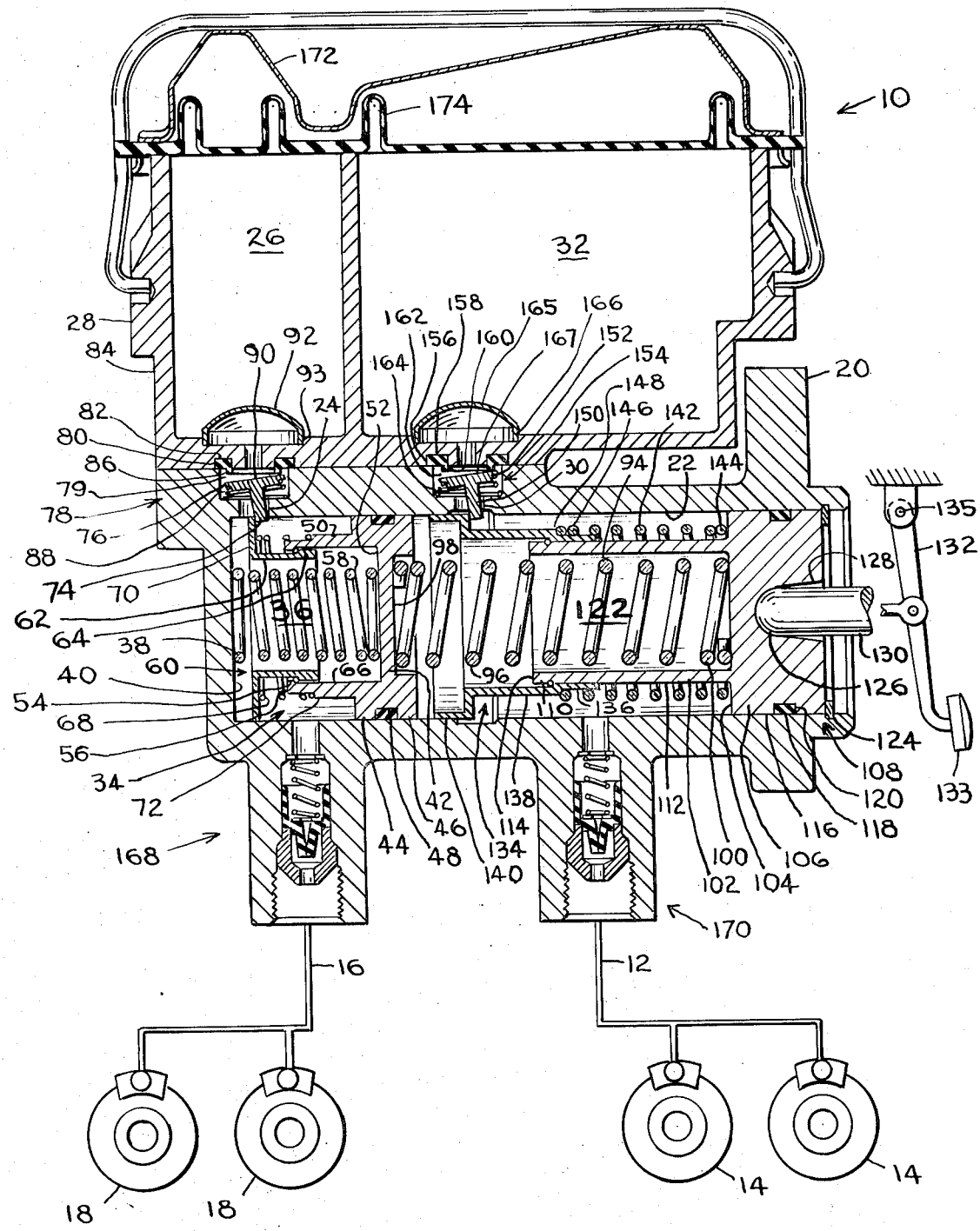
FIG. 1 is a sectional view of a master cylinder having resiliently positioned primary and secondary pistons each of which independently control separate compensating valves connected to a supply reservoir through resiliently held telescoping valve actuators.

The master cylinder 10 shown in FIG. 1 has a first conduit section 12 connected to the front wheels 14 and a second conduit section 16 connected to the rear wheels 18 of a vehicle braking system.

The master cylinder 10 consists of a housing 20 having a blind bore 22 with a first passage 24 connected to a first compartment 26 of a fluid reservoir 28 and a second passage 30 connected to a second compartment 32 of the reservoir 28. A first piston means 34 is located in the blind bore 22 to form a first variable volume chamber 36. A first resilient means 38 located between the bottom 40 of the blind bore 22 and first piston means 34 biases the first piston means 34 away from the bottom 40 of the blind bore 22.

The first piston means 34 has a solid plug 42 with a forward hoop 44 and a rearward hoop 46 secured adjacent to the periphery 48 of the solid plug 42. A cylindrical projection 50 extends from the forward face 52 of the solid plug 42. A rib 54 is located on the inner periphery 66 of the end 56 of the cylindrical projection 50. One end 58 of the resilient means 38 is surrounded by the cylindrical projection 50.

Sleeve means 60 having a body 62 which surrounds a portion of the resilient means 38 has a flange 70 on one end and land 64 on the other end. The land 64 rides along the inner periphery 66 of the cylindrical projection 50. A spring 68 located between a shoulder 72 on the cylindrical projection and the flange 70 holds land 64 against rib 54.

In the rest position shown in FIG. 1, flange 70 engages the stem 74 of a plate 76 of valve means 78 located in a valve chamber 79 of the first passage 24. A sealing ring 80 located in groove 82 on the housing 84 of the reservoir 28 has a lip 86 which extends into the valve chamber 79. A spring 88 located between plate 76 and the bottom of the valve chamber 79 biases the face 90 toward lip 86 to seal the communication from the variable volume chamber 36 through the first passage 24 to the reservoir 28 upon movement of flange 70 toward the bottom 40 of the blind bore 22. A filter 92 is secured in a concentric groove 93 around passage 24 leading from the bottom of reservoir compartment 26 to prevent contaminants from entering the braking system through the first variable volume chamber 36.

A second resilient means 94 has a first end 96 retained on the rearward side 98 of the solid plug 42 by hoop 46 and a second end 100 retained in a cylindrical projection 102 extending from the forward face 104 of a solid plug 106 of a second piston means 108. The cylindrical projection 102 has a rib 110 on the outer periphery 112 of end 114 away from face 104.

The solid plug 106 has a diameter 116 substantially equal to that of the blind bore 22. A groove 120 in diameter 116 retains a seal 118 to assure that the fluid in the second variable volume chamber 122 formed between the first and second piston means 34 and 108, respectively, does not escape to the atmosphere. Resilient means 94 biases the second piston means 108 away from the first piston means 34 against snap ring stop 124. A socket 126 on the rear face of the solid plug 106 has tapered walls 128 to permit a push rod 130, connected to pivotal lever arm 132, freedom in applied movement without binding.

Sleeve means 134 has a body 138 with a first guide surface 136 which surrounds the outer periphery 112 of the cylindrical projection 102 and a second guide surface 140 which is concentric to the blind bore 22. A spring 142 which surrounds the cylindrical projection 102 has one end 144 abutting the forward face 104 of the solid plug 106 and another end 146 resting on shoulder 148 of sleeve means 134. Spring 142 urges the first guide surface 136 against rib 110 on the cylindrical projection 102. The first guide surface 140 engaging a stem 150 of plate 152 of the compensating valve means 154 located in valve chamber 162 of the second passage 30.

A sealing ring 156 located in groove 158 on the bottom of the housing 84 of the reservoir 28 has a lip 160 which extends into the valve chamber 162. A spring 164 located between plate 152 and the bottom of the valve chamber 162 biases the face 167 toward lip 160 to seal the communication between the second variable chamber 122 upon the second guide surface 140 moving toward hoop 46 of the first piston means 34. A filter 165 located in concentric groove 166 surrounding the second passage 30 will prevent any contamination from entering the second variable volume chamber 122 from the compartment 32 of the reservoir 28.

Residual pressure check valves 168 and 170 in communication with the first variable volume chamber 36 and second variable volume chamber 122, respectively, maintain a predetermined pressure at all times in conduits 16 and 12, in a manner well known to those skilled in braking systems.

A cap 172 and a flexible sealing cover 174 close the top side of the reservoir 28 against contaminants but permit atmospheric pressure to act on the flexible cover to maintain a desired system pressure.

MODE OF OPERATION OF THE PREFERRED EMBODIMENT

The master cylinder 10, shown in FIG. 1 is in the brake release position. Resilient means 38 and 94 hold piston means 34 and 108 against stop 124 to permit flange 70 and guide surface 140 to open the first and second compensating valves 78 and 154. With compensating valves 78 and 154 open, fluid in compartments 26 and 32 of reservoir 28 is free to flow through the first and second passages 24 and 30 to the first and second variable volume chambers 36 and 122.

When an operator desires to apply the front 14 and the rear 18 brakes, a force is applied to pedal 133 causing lever arm 132 to pivot about pin 135 and transmit an input force to push rod 130. An initial operational force will cause resilient means 94 to collapse and permit the solid body 106 of the second piston means to move in the blind bore since resilient means 94 is designed to have a smaller resistive load than resilient means 38. During initial movement of the solid body 106 spring 142 will hold sleeve 134 against lip 114 causing the second guide surface 140 to correspondingly move in the blind bore 22 toward the first piston means 34. As the second guide surface 140 moves in the blind bore 22 it will disengage stem 150 to permit spring 164 to seat face 167 on lip 160 and seal the second variable volume chamber 122 from fluid communication with compartment 32 of the reservoir 28.

Further force on the pedal 133 will cause piston means 108 to exert a force on the now trapped fluid in the second variable volume chamber 122 and develop a corresponding first fluid pressure therein. This developed fluid pressure will be transmitted through conduit 12 to the front wheel brakes to initiate braking of the vehicle.

An additional increase in the input force from the operator added to the first fluid pressure acting on the rear 98 of the solid body 42 will overcome the first resilient means 38 and permit the first piston means 34 to move. During initial movement of first piston means 34, flange 70 will disengage stem 74 and allow spring 88 to seat face 90 on lip 86. With face 90 seated on lip 86 fluid communication between the first variable volume chamber 36 and compartment 26 of the reservoir 28 is precluded.

With a further increase in the operational input force the first and second piston means 34 and 108 will both slide in the blind bore 22 and develop an operational fluid pressure in the first and second variable volume chambers to operate the front and rear brakes 14 and 18.

When flange 70 of the first piston means 34 contacts bottom 40 of the blind bore 22, movement of the first piston means 34 will still be possible since guide surface 64 can slide along the inner periphery 66 of the cylindrical projection 50. Correspondingly, if the second guide surface 140 contacts hoop 46 on the rear of the first piston, spring 142 will collapse and permit the first guide surface 136 to slide on periphery 112 of cylindrical projection 102. Since sleeve means 60 and 134 are adapted to be compacted into the first and second piston means 34 and 108, an overall length of travel to produce optimum fluid pressure for a given piston diameter is achieved.

Upon termination of the input force on lever arm 132, resilient means 38 will move the first piston means 34 away from the bottom 40 of the blind bore 22. When the first piston means 34 has moved a predetermined distance spring 68 will hold sleeve means 60 in the extended position. With the sleeve means 60 in an extended position, flange 70 engages stem 74 and under the influence of resilient means 38 causes plate 90 of the compensation valve 78 to tilt about lip 86. When plate 90 is tilted, the fluid pressure in the first variable volume chamber 36 and compartment 26 are equal.

Sequentially, when the first piston means 34 is moved to the non-applied position, shown in FIG. 1, the second resilient means 96 will move the second piston means 108 against stop 124. As the second piston means 108 moves against stop 124, spring 144 will urge the first guide surface 146 against lip 114 causing the second guide surface 140 to engage stem 150 and tilt face 167 from a seating position on lip 160. Thus, the fluid pressure in the second variable volume chamber 122 will be the same as in compartment 32 of reservoir 28.

Through the above sequential first and second pistons 34 and 108 movement in the first variable volume chamber 36 and the second variable volume chamber 122 it is impossible to create a lock up in the second variable volume chamber 122 following a pump up or rapid pulsation of the lever arm 132. If pressure develops in chamber 36, spring 94 will be overcome and piston means 34 moved to the right. Since the compensation valve is controlled by the flange 70 which is tied to the piston means 34, once sufficient movement of the piston has tilted the plate 76 off lip 86 the fluid pressure will escape into the reservoir. Correspondingly, any fluid pressure built up in the second variable volume chamber 122 will act on face 104 to move the solid body 106 against stop 124. Since the operation of the compensation valve 154 is tied to the second valve means 108 when the solid body 106 is against stop 124, fluid pressure is freely passed to the reservoir through passage 30.

Throughout the remainder of this specification wherein like parts are used in the additional embodiment, the same identification numeral will be used.

Figure 2:
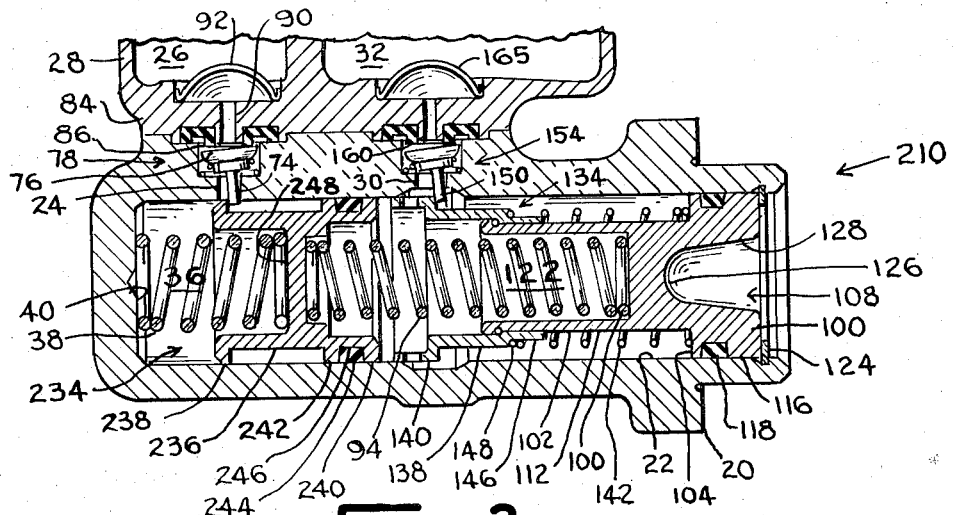
FIG. 2 is a sectional view of a second embodiment which includes primary and secondary pistons retained in a bore of a master cylinder having a valve actuator integral with the secondary piston.

The master cylinder 210 shown in FIG. 2 is identical to that of FIG. 1 except for the first piston means 234 and the connections 12 and 14 to the front and rear brakes (not shown) which are positioned along the side instead of on the bottom of the blind bore 22. By moving the connection to the side any possible particle contaminants which might pass through filters 92 and 165 will be trapped in the blind bore and not communicated throughout the braking system.

Figure 3:
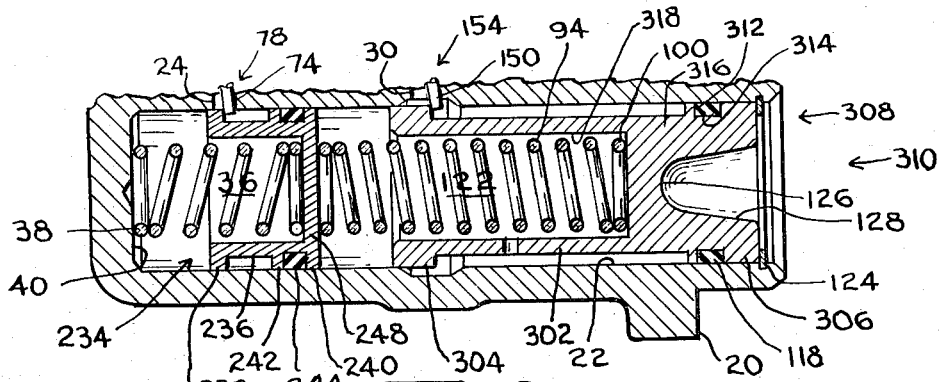
FIG. 3 is a sectional view of a third embodiment which includes primary and secondary pistons retained in a bore of a master cylinder each having integral actuators for compensating valves controlling communication from the bore to a supply reservoir.

The first piston means 234 consists of a cylindrical body 236 with a first flange 238 on one end and a second flange 240 on the other end. The first and second flanges 238 and 240 have a diameter substantially equal to that of the blind bore 22. A third flange 242 located adjacent the second flange 240, forms a groove 246 for holding seal 244 to prevent fluid in the first variable volume chamber 36 from passing into the second variable volume chamber 122. The interior of the cylindrical body 236 is closed by a solid disc 248. The location of the solid disc 248 between the first and second flanges 238 and 240 can be varied from the midpoint shown in FIG. 2 to adjacent one end as shown in FIG. 3. The first resilient means 38 located between the bottom 40 of the blind bore 22 and disc 248 will hold the first piston means 234 away from the bottom of the blind bore 22 causing flange 238 to engage stem 74 and unseat plate 76 from lip 86 of the first compensating valve means 78.

The mode of operation of the master cylinder 210 is the same as master cylinder 10. When sufficient input force has developed, a first pressure in the second variable volume chamber 122 after the first guide surface 140 has disengaged stem 150 of the second compensating valve means 154 to overcome the first resilient means 38, piston means 234 will move toward the bottom 40 of the blind bore 22. Immediately upon the first piston means 234 moving, flange 238 will correspondingly begin to disengage stem 74 to close communication between the first variable chamber 36 and compartment 26 of the reservoir 28. With further movement of the first piston means 234, a second fluid pressure will be developed in this first variable volume chamber 36. The developed second fluid pressure will now be distributed through conduit 16 to the rear brakes of a vehicle. Upon termination of the input force the first piston means 234 will be moved by resilient means 38 to open the compensating valve means 78 prior to the opening of compensating valve means 154 by the second piston means 108 as fully described in conjunction with FIG. 1.

The master cylinder 310 shown in FIG. 3 is exactly like the master cylinder 210 described above with the exception that the second piston means 308 is constructed of a unitary member having a cylindrical body 302 with a first flange 304 on one end and a second flange 306 on the other end. The first and second flanges have a diameter substantially equal that of the blind bore 22. A third flange 312 adjacent the second flange 306 forms a groove 314 to hold seal 118. A solid disc 316 located in and secured to the inner periphery 318 of the cylindrical body 302 will provide a surface for end 100 of the resilient means 94 to act on in urging the second flange 306 toward stop 124.

The operation of the master cylinder 310 is exactly the same as master cylinder 210. Upon receiving a sufficient input force at socket 126 to overcome resilient means 94, the second piston means 308 will slide in the blind bore. During initial sliding flange 304 will correspondingly disengage stem 150 of compensating valve means 154 to close communication between the second variable volume chamber 122 and reservoir 28. As described above in conjunction with FIGS. 1 and 2, further input force on the second piston means 308 will develop a fluid pressure in the second variable volume chamber 122 which will be communicated through conduit 12 to initiate actuation of the front brakes 14 of a vehicle. Further input will result in actuation of the first piston means 234 to develop a second operational fluid pressure as described above. Similarly upon termination of the input force, flange 238 of the first piston means 234 will engage stem 74 of the first compensating valve 78 prior to flange 304 engaging stem 150. By having the compensation valve means 78 and 154 directly opened and closed by an integral part of the first and second piston means 234 and 308 a more synchronized control between the first 36 and second 122 variable volume chambers and reservoir 28 can be achieved.

Figure 4:
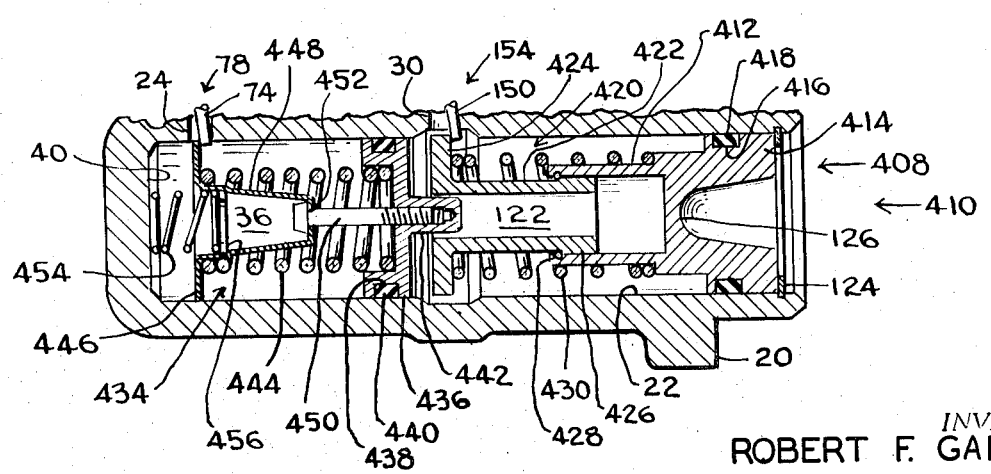
FIG. 4 is a sectional view of a fourth embodiment which includes primary pistons having a resiliently held telescoping compensating valve actuator and a secondary piston having a caged valve actuator retained in a bore of a master cylinder.

The master cylinder 410 shown in FIG. 4 is the same as master cylinder 10 shown in FIG. 2 with the exception of the first piston means 434 and the second piston means 408. The first piston means 434 consists of a cylindrical body or disc means 436 having a groove 438 for holding a seal 440. The cylindrical body 436 has a diameter substantially equal to the diameter of the blind bore 22. Disc means 436 has a central projection 442 which extends into the second variable volume chamber 122. A resilient member 444 is held between the disc means 436 and a flange 446 on the opened end of a conical member 448 by an adjustable bolt 450 which extends through a central opening 452. Bolt 450 controls the linkage between the conical member 448 and disc means 436 by being adjustably designed with the central projection 442. A return spring 454 located between the bottom 40 of the blind bore 22 and a shoulder 456 on the conical member holds the first piston means 434 away from the bottom 40 of the blind bore 22 causing flange 446 to engage stem 74 of compensating valve means 78. With flange 446 engaging stem 74 fluid communication between the first variable volume chamber 36 and reservoir 28 is opened.

The second piston means 408 consists of a cylindrical body 412 having a solid disc 414 secured to one end. The solid disc 414 has a diameter substantially equal to that of the blind bore. The solid disc has a groove 416 for holding seal 418 to prevent fluid in the second variable volume chamber 122 from escaping the blind bore 22. Sleeve means 420 has a body 422 with a flange 424 on one end and a guide surface 426 on the other end. Guide surface 426 is located in the cylindrical body 412 and held against a lip 428 on the cylindrical body 412 by a resilient member 430. Flange 424 engages stem 150 of compensating valve means 154 to open fluid communication between the second variable volume chamber 122 and the reservoir 28. Upon the second piston means 408 receiving an input force at socket 126 from an operator, disc 414 will slide in the blind bore. Spring 430 will move the sleeve means 420 by acting on flange 424 to close compensating valve 154 to prevent communication between the second variable volume chamber 122 and the reservoir 28. Further input force will cause flange 424 to contact the first piston means 434 and overcome spring 454 causing the first piston means 434 to move. During initial movement of the first piston means, flange 446 will disengage stem 74 of compensating valve means 78 to close communication between the first variable volume chamber 36 and the reservoir 28. With resilient means 430 having a smaller resistive force than resilient means 444, further input to the second piston means 408 will overcome resilient means 430. When resilient means 430 is collapsed, the input force applied to solid disc 414 is developed into a first fluid pressure in chamber 122. This first fluid pressure is communicated to the front wheel brakes 14. This first fluid and additional input force together overcome resilient means 444 to move the first piston means 434 toward the bottom 40 of the blind bore 22 and compress the trapped fluid in the first variable volume chamber 36. Upon the first piston means 434 acting on the trapped fluid, a second fluid pressure will be developed. This second fluid pressure will be transmitted by conduit 16 to operate the rear wheel brakes 18.

Termination of the input force will cause the above sequence to be reversed with resilient means 444 moving disc 436 away from flange 446 first, then resilient means 430 moves solid disc 414 away from flange 424, after which return spring 454 moves the first piston away from the bottom 40 of the blind bore 22 causing flange 446 to engage stem 74 and open communication between the first variable volume chamber 36 and reservoir 28 to allow any fluid pressure to escape. When return spring 454 moves piston 434 away from the bottom 40, a hydraulic pressure will develop to move the second piston means 408 against stop 124. With the second piston means 408 against stop 124, flange 424 engages stem 150 to open communication between the second variable chamber 122 and the reservoir 28.

Through the above embodiments I have described a new concept in master cylinder construction which will eliminate the creation of lock up caused by fluid being trapped in the rear chamber after stroking the pedal rapidly.

I claim:

1. A master cylinder for a hydraulic system, comprising:

a housing having a blind bore therein;

reservoir means for retaining a quantity of fluid for said hydraulic system;

first piston means located in said blind bore to form a first variable volume chamber therein with the bottom of said blind bore, said first piston means having a first cylindrical projection extending from a forward face of a first solid plug, said cylindrical projection having a first rib located along the inner periphery on the end of the cylindrical projection away from the face, said first variable volume chamber being connected to a first segment of said hydraulic system;

first sleeve means concentric to the cylindrical projection, said sleeve means having an outwardly extending flange on one end and a land on the other end, said land being concentrically located along a surface of said cylindrical projection;

first spring means located between said forward face and flange for urging said land against said rib;

first resilient means located between the first piston means and the bottom of said blind bore for biasing said first piston means away from the bottom of said blind bore;

first passage means located in said housing for connecting said reservoir with said first variable volume chamber;

first valve means located in said first passage means responsive to movement of said first piston means for controlling the flow of fluid from said reservoir to said first variable volume chamber;

a second cylindrical projection extending from the forward face of a second solid plug, said second resilient means being retained by said second cylindrical projection, said cylindrical projection having a second rid along the outer periphery of the end away from the forward face;

second sleeve means surrounding said second cylindrical projection having a body with a first guide surface which is concentric to the outer surface of the second cylindrical projection and a second guide surface which is concentric to said blind bore;

second spring means located between the second forward face and second sleeve means for urging said first guide surface against said second rib;

second piston means located in said blind bore adjacent said first piston means to form a second variable volume chamber therebetween, said second variable volume chamber being connected to a second segment of said hydraulic system;

second resilient means located between said first and second piston means for biasing said second piston means away from the first piston means;

second passage means located in said housing for connecting said reservoir with said second variable volume chamber;

second valve means located in said second passage means responsive to movement of said second piston means for controlling the flow of fluid from said reservoir to said second variable volume chamber;

actuator means for transmitting an initial force to overcome said second resilient means and permit said second piston means to move, said second piston means upon moving permitting said second valve means to independently close and prevent fluid flow transmission through said second passage means from said second variable volume chamber to said reservoir, said second piston means receiving further input force to create a primary fluid pressure in the second variable volume chamber, said primary fluid pressure being communicated to said second segment of the hydraulic system and said first piston means, said primary fluid pressure and said second piston means upon receiving an additional input force overcoming said first resilient means and permitting said first piston means to move, said first spring moving said flange out of disengagement with said first valve means upon initial movement of said first piston means;

said second spring means moving said first guide surface out of disengagement with said second valve means upon initial movement of said second piston means, said second valve means closing independently to prevent fluid flow from the second variable volume chamber to the reservoir, said first guide surface being adapted to slide on the outer surface of the second cylindrical projection upon said second piston means engaging said first piston means; and said first valve means independently closing said first passage to prevent fluid flow from the first chamber to the reservoir, said second piston means upon receiving an additional input force moving said first piston means to create a secondary fluid pressure in the first variable volume chamber, said land of the first sleeve means sliding along the inner surface of the first cylindrical projection when said flange engages the bottom of the blind bore as the first piston means moves in response to said additional input force, said secondary fluid pressure in the first chamber being communicated to said first segment of the hydraulic system.

2. The master cylinder as recited in claim 1 wherein said first piston means further includes:

a hoop member located on the rear face of said first solid plug;

said hoop member having an outside diameter substantially equal to said blind bore, said second guide surface in contacting said hoop member causing said first guide surface to slide on said second cylindrical projection when said second piston means receives a predetermined input force.

3. The master cylinder as recited in claim 1 wherein said first and second valve means located in the first and second passageways each include:

a ring member secured in the passageways having a lip located downstream from the reservoir;

a plate member having a stem which extends into the variable volume chamber to contact the piston means; and biasing means for urging said plate on said lip to prevent communication of fluid from the variable volume chamber thorugh the ring when the piston means disengages said stem.

4. A master cylinder for a hydraulic system, comprising:

a housing having a blind bore therein;

reservoir means for retaining a quantity of fluid for said hydraulic system;

first piston means located in said blind bore to form a first variable volume chamber therein with the bottom of said blind bore, said first variable volume chamber being connected to a first segment of said hydraulic system;

first resilient means located between the first piston means and the bottom of said blind bore for biasing said first piston means away from the bottom of said blind bore;

first passage means located in said housing for connecting said reservoir with said first variable volume chamber;

first valve means located in said first passage means responsive to movement of said first piston means for controlling the flow of fluid from said reservoir to said first variable volume chamber;

second piston means located in said blind bore adjacent said first piston means to form a second variable volume chamber therebetween, said second variable volume chamber being connected to a second segment of said hydraulic system;

second resilient means located between said first and second piston means for biasing said second piston means away from the first piston means;

second passage means located in said housing for connecting said reservoir with said second variable volume chamber;

second valve means located in said second passage means responsive to movement of said second piston means for controlling the flow of fluid from said reservoir to said second variable volume chamber;

one of said first and second piston means includes a cylindrical projection extending from a forward face on a solid plug, said cylindrical projection having a lip located along the periphery on the end of the cylinder away from the face;

sleeve means concentric to the cylindrical projection, said sleeve means having a flange on one end and a land on the other end, said flange being adapted to correspondingly engage one of said first and second valve means, said land being located between said lip and the forward face;

first spring means located between the forward face and the flange for urging the land toward said lip, said first spring means moving said sleeve means with one of said first and second piston means when the flange disengages one of said corresponding first and second valve means, said first spring means being collapsible to allow said land to slide on the cylindrical projection when the second piston means contacts the first piston means; and actuator means for transmitting an initial force to overcome said second resilient means and permit said second piston means to move, said second piston means upon moving permitting said second valve means to independently close and prevent fluid flow transmission through said second passage means from said second variable volume chamber to said reservoir, said second piston means receiving further input force to create a primary fluid pressure in the second variable volume chamber, said primary fluid pressure being communicated to said second segment of the hydraulic system and said first piston means, said primary fluid pressure and said second piston means upon receiving additional input force overcoming said first resilient means and permitting said first piston means to move, said first piston means upon moving permitting said first valve means to independently close and prevent fluid flow transmission through said first passage from said first variable volume chamber to said reservoir, said second piston means upon an additional input force moving said first piston means to create a secondary fluid pressure in the first variable volume chamber, said secondary fluid pressure in the first chamber being communicated to said first segment of the hydraulic system.

5. The master cylinder as recited in claim 4 wherein said first and second valve means located in the first and second passageways each include:
   a ring member secured in the passageways having a lip located downstream from the reservoir;
   a plate member having a stem which extends into the variable volume chamber to contact the piston means; and
   biasing means for urging said plate on said lip to prevent communication of fluid from the variable volume chamber through the ring when the piston means disengages said stem.

6. A master cylinder for a hydraulic system, comprising:
   a housing having a blind bore therein;
   reservoir means for retaining a quantity of fluid for said hydraulic system;
   first piston means located in said blind bore to form a first variable volume chamber therein with the bottom of said blind bore, said first variable volume chamber being connected to a first segment of said hydraulic system;
   first resilient means located between the first piston means and the bottom of said blind bore for biasing said first piston means away from the bottom of said blind bore;
   first passage means located in said housing for connecting said reservoir with said first variable volume chamber;
   first valve means located in said first passage means responsive to movement of said first piston means for controlling the flow of fluid from said reservoir to said first variable volume chamber;
   second piston means located in said blind bore adjacent said first piston means to form a second variable volume chamber therebetween, said second piston means includes a first cylindrical projection extending from the forward face of a first solid plug, said first cylindrical projection having a rib along the periphery of the end away from the forward face, said second variable volume chamber being connected to a second segment of said hydraulic system;
   first sleeve means having a body with a first guide surface which is concentric to the surface of the first cylindrical projection and a second guide surface which is concentric to said blind bore;
   first spring means located between the forward face and the first sleeve means for urging said first guide surface against said rib;
   second resilient means located between said first and second piston means for biasing said second piston means away from the first piston means;
   second passage means located in said housing for connecting said reservoir with said second variable volume chamber;
   second valve means located in said second passage means responsive to movement of said second piston means for controlling the flow of fluid from said reservoir to said second variable volume chamber; and
   actuator means for transmitting an initial force to overcome said second resilient means and permit said second piston means to move, said second guide surface being moved by said first spring means to become disengaged from said second valve means upon initial movement of said second piston means, said second valve means independently closing said first passage to prevent fluid flow transmission through said second passage means from said second variable volume chamber to said reservoir, said second piston means receiving further input force to create a primary fluid pressure in the second variable volume chamber, said primary fluid pressure being communicated to said second segment of the hydraulic system and said first piston means, said first guide surface being adapted to slide on a first guide surface of the first cylindrical projection upon the second piston means engaging the first piston means, said primary fluid pressure and said second piston means upon receiving additional input force overcoming said first resilient means and permitting said first piston means to move, said first piston means upon moving permitting said first valve means to independently close and prevent fluid flow transmission through said first passage from said first variable volume chamber to said reservoir, said second piston means upon receiving an additional input force moving said first piston means to create a secondary fluid pressure in the first variable volume chamber, said secondary fluid pressure in the first chamber being communicated to said first segment of the hydraulic system.

7. The master cylinder as recited in claim 6 wherein said first piston means includes:
   a second cylindrical projection extending from a forward face of a second solid plug, said second resilient means being retained on said second cylindrical projection, said second cylindrical projection having a lip located along the periphery on the end of the second cylindrical projection away from the face;

second sleeve means surrounded by the second cylindrical projection, said second sleeve means having a flange on one end and a land on the other end, said land being concentrically located along the inner surface of said cylindrical projection; and second spring means located between said second cylindrical projection and second sleeve means for urging said land against said lip, said second spring means moving the flange out of disengagement with said valve means upon initial movement of said first piston means, said first valve means independently closing said first passage to prevent fluid flow from the first chamber to the reservoir, said land of the second sleeve means sliding along the inner surface of the second cylindrical projection when said flange engages the bottom of the blind bore as the first piston means moves in response to said additional input force.

8. The master cylinder as recited in claim 7 wherein said first and second valve means located in the first and second passageways each include:

a ring member secured in the passageways having a lip located downstream from the reservoir;

a plate member having a stem which extends into the variable volume chamber to contact the piston means; and biasing means for urging said plate on said lip to prevent communication of fluid from the variable volume chamber through the ring when the piston means disengages said stem.

9. The master cylinder as recited in claim 6 wherein said first piston means includes:

disc means having a diameter substantially equal to said blind bore, said disc means having a central projection extending into said second varible volume chamber;

a conical member having a central opening and a peripheral flange on the open end, said peripheral flange being adapted to engage said first valve means;

linkage means passing through said central opening and secured to the disc means; and second spring means located between said disc means and flange to maintain a predetermined distance between said conical member and disc means during initial movement of the second piston means to assure positive operation of the first valve means before movement of said first piston means which closes communication between the first variable volume chamber and said reservoir.

* * * * *